3,301,134
INCREMENTAL HOB SHIFT MECHANISM
David W. Daniel, Birmingham, Mich., assignor to National Broach & Machine Company, Detroit, Mich., a corporation of Michigan
Filed Mar. 24, 1965, Ser. No. 442,374
3 Claims. (Cl. 90—4)

The present invention relates to incremental hob shift mechanism.

It is an object of the present invention to provide a simple yet efficient mechanism for effecting incremental axial shifting movement of a hob after predetermined usage.

It is a further object of the present invention to provide adjustable mechanism for variably predeterming the increment by which the hob is periodically shifted.

It is a further object of the present invention to provide simple mechanism for effecting a quick return of the hob to its initial position after it has been incrementally shifted a predetermined distance.

It is a feature of the present invention to provide, in hob shifting mechanism, a feed screw, means for rotating the feed screw in one direction by predetermined increments, a partial nut device normally in threaded engagement with the feed screw, and means for moving the partial nut device radially out of threaded engagement with the screw to permit relative shifting movement between the screw and nut device in a direction parallel to the axis of the screw.

Other objects and features of the invention will become apparent as the description proceeds, especially when taken in conjunction with the accompanying drawing, illustrating a preferred embodiment of the invention, wherein.

Figure 1:
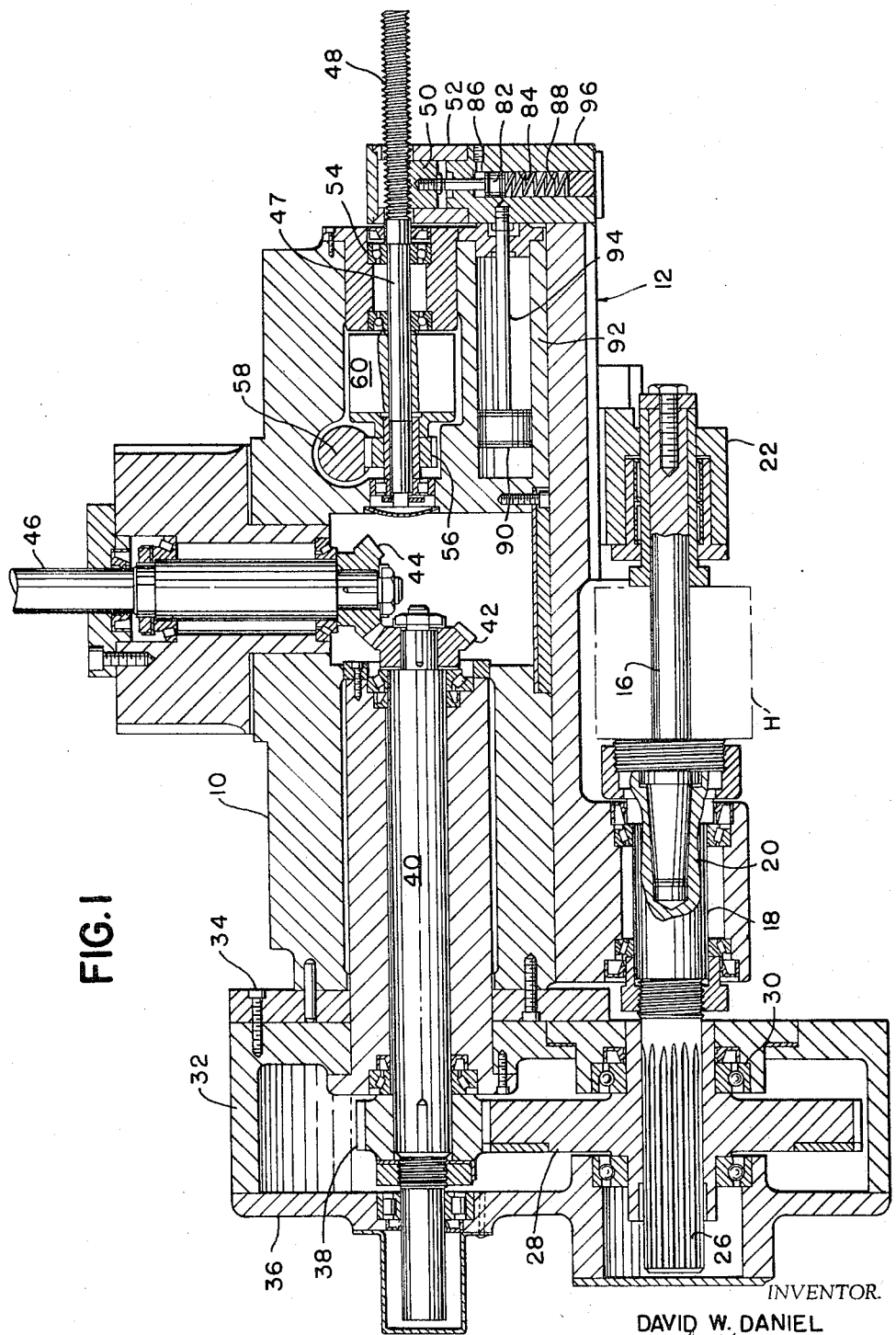
FIGURE 1 is a longitudinal section through the hob shift mechanism.

The hob head comprises a frame 10 to the underside of which a hob supporting carriage 12 is connected by a dovetail connection indicated generally at 14. The carriage 12 mounts a hob H on a shaft 16 connected to a drive spindle 18 by the tapered drive connecting illustrated at 20. The outer end of the shaft 16 engages in an outboard support 22 slidably connected to the underside of the carriage 12 by gibs 24. The drive shaft 18 is splined as indicated at 26 and is thereby slidably connected to a gear 28 mounted in suitable bearings 30 provided in a gear housing 32 bolted or otherwise secured to the hob head 10 as indicated at 34. The housing 32 is provided with a removable cover plate 36.

The gear 28 meshes with a pinion 38 keyed to a shaft 40 which is driven through bevel gears 42, 44 from the input hob drive shaft 46.

The mechanism for effecting periodic incremental shifting movement of the hob carriage 12 comprises a screw shaft 47 having a threaded portion 48 engageable with a half nut 50 mounted for sliding movement only in a guide member 52. The screw shaft 47 is mounted for rotation in the hob head by bearings 54 but is prevented from axial movement therein. Periodic incremental rotation is imparted to the screw shaft 47 by means of a pinion 56 engaged with a rack 58. The pinion 56 is connected to the screw shaft 47 by means of an over-running clutch 60 adapted to impart rotation to the shaft 47 only in the direction which will result in travel of the half nut 50 to the right, as seen in FIGURE 1.

Figure 2:
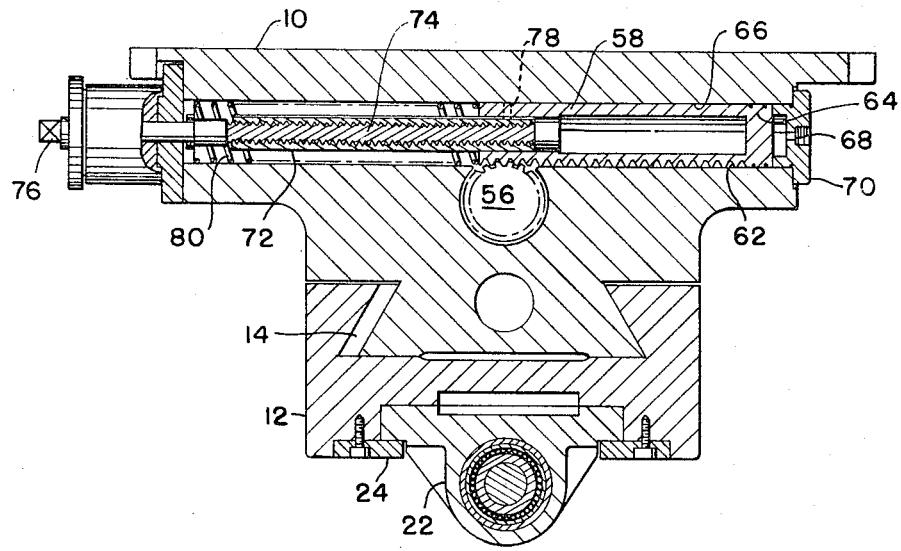
FIGURE 2 is a sectional view on the line 2—2, FIGURE 1.

The rack 58, as best seen in FIGURE 2, is formed by providing rack teeth 62 along one side of a tubular member 58 having a closed end 64. The tubular member 58 is slidable in a cylinder 66 and actuating pressure fluid may be admitted to and discharged from a port 68 provided in a removable coupling 70.

Upon admission of fluid to the cylinder 66 the tubular member or rack 58 is moved as a piston to the left as seen in FIGURE 2. The extent of this movement is determined by a tubular adjustable abutment 72 threaded to an elongated adjusting screw 74 having an external actuating portion 76 preferably suitably associated with an indicator to afford a reading of the stroke provided for the tubular member or rack 58 and hence, an ndication of the increment by which the hob H will be adjusted.

The internally threaded abutment member 72 is provided with an elongated slot which receives the inner end of a pin 78 which retains the member 72 against rotation. A compression spring 80 is provided in the cylinder 66 and engages the inner end of the piston or rack member 58 so that when fluid pressure is released from the right hand end of the cylinder 66, the spring 80 returns member 58 to the position illustrated in FIGURE 2.

In order to release the hob carriage 12 for quick return to its initial position, a piston 82 is provided in a cylinder 84 to which fluid pressure may be introduced through a fitting indicated at 86. The piston 82 is connected to the half nut 50 and when pressure is admitted through the fitting 86, the half nut is shifted radially of the threaded portion 48 of the threaded shaft 47 out of threaded engagement therewith to permit rapid shifting of the hob carriage 12 to its initial position.

A compression spring 88 is provided in the cylinder 84 and is effective, when fluid pressure is released from the cylinder 84, to maintain the half nut 50 in threaded engagement with the threaded portion 48 of the shaft 47.

When the hob carriage 12 has been shifted throughout its full range of travel, quick return of the hob to its initial position is provided by a piston 90 movable in a cylinder 92 and connected by a piston rod 94 to a block 96 in which the cylinder 84 is formed. The block 96 is connected to the hob carriage 12 by suitable means (not shown).

It will of course be appreciated that suitable conventional valving means is provided for effecting control of the actuating fluid which may be air or hydraulic fluid. Thus, after a predetermined amount of hob usage, as for example after a predetermined number of relative traverse strokes between the hob and work support, fluid pressure is admitted briefly through the port 68 to the cylinder 66. This effects reciprocation of the rack 58, the return stroke being accomplished by the spring 80. This movement of the rack 58 through the overrunning clutch 60 provides an incremental rotation to the threaded shaft 48 which through the nut 50 effects a predetermined shifting movement of the hob carriage 12 in a direction parallel to the axis of the hob. After a predetermined travel of the hob, which may be predetermined by a limit switch or by counting the total number of incremental movements thereof, fluid under pressure is admitted to the cylinder 84 causing the piston 82 to withdraw the half nut 50 from engagement with the threaded portion 48 of the shaft 47. At the same time, or after a minor delay, fluid is admitted to the cylinder 92 to effect, through the piston 90, return movement of the hob carriage 12 to its initial position. Upon return of the hob carriage to initial position fluid pressure is relieved from the cylinder 84 and the spring 88 returns the half nut 50 into engagement with the threaded portion 48 of the shaft 47. At this time it may happen that the nut 50 may not enter into full engagement with the threads on the shaft portion 88. The threads of the threaded position and nut are made of the buttress type so that initial rotation of the threaded portion 48 will enable the half nut 50 to enter into full engagement therewith.

With the foregoing construction the incremental hob movement can be predetermined and the magnitude of the incremental movement is infinitely adjusted but once selected it is constant over the whole range of movement.

The present construction is characterized by the simplicity in both the drive and return mechanisms. It is operable by fluid pressure, either hydraulic or pneumatic, and does not require an electric motor. The incremental movement is provided by a lead screw and is therefore positive and of exactly predeterminable increments. On the other hand, the return to initial position is by fluid pressure following disengagement between the lead screw and nut. Finally, the amount of incremental advance of the hob can be manually set by means associated with a dial which may be graduated to give a direct reading in terms of hob advance.

The drawing and the foregoing specification constitute a description of the improved incremental hob shift mechanism in such full, clear, concise and exact terms as to enable any person skilled in the art to practice the invention, the scope of which is indicated by the appended claims.

What I claim as my invention is:

1. In a hobbing machine, a hob support, a hob carriage on said support, a hob spindle on said carriage, said carriage being movable on said support in a direction parallel to said spindle, drive means for said spindle operable in all positions of said carriage on said support, incremental hob shift mechanism operable to shift said carriage by increments from a starting position to a final position and to return said carriage rapidly in a single movement to starting position, said mechanism comprising a first fluid pressure actuated piston and cylinder device connected between said support and carriage, a shifting device connected between said support and carriage and comprising a screw and a half nut engageable with one side of said screw and movable radially of said screw into and out of thread engaging relation with reference to said screw, means for effecting incremental relative rotation between said screw and half nut in timed relation to hobbing operations to shift said carriage by increments from said starting to said final position, and means responsive to arrival of said carriage at final position to move said half nut radially out of thread engaging relation with respect to said screw and to apply fluid pressure to said first piston and cylinder device to restore said carriage to starting position, the means for moving said half nut radially of said screw comprising a second fluid pressure actuated piston and cylinder device.

2. Mechanism as defined in claim 1 in which said second piston and cylinder device comprises a fluid connection for actuating said device to withdraw said half nut from said screw, and resilient means acting between the piston and cylinder device to urge said half nut into engagement with said screw, the threads of said screw and half nut being of buttress type.

3. In a hobbing machine, a hob support, a hob carriage on said support, a hob spindle on said carriage, said carriage being movable on said support in a direction parallel to said spindle, drive means for said spindle operable in all postions of said carriage on said support, incremental hob shift mechanism operable to shift said carriage by increments from a starting position to a final position and to return said carriage rapidly in a single movement to starting position, said mechanism comprising a first fluid pressure actuated piston and cylinder device connected between said support and carriage, a shifting device connected between said support and carriage and comprising a screw and a half nut engageable with one side of said screw and movable radially of said screw into and out of thread engaging relation with reference to said screw, means for effecting incremental relative rotation between said screw and half nut in timed relation to hobbing operations to shift said carriage by increments from said starting to said final position, means responsive to arrival of said carriage at final position to move said half nut radially out of thread engaging relation with respect to said screw and to apply fluid pressure to said first piston and cylinder device to restore said carriage to starting position, the means for moving said half nut radially of said screw comprising a second fluid pressure actuated piston and cylinder device, and the means for effecting relative rotation between said screw and half nut comprising a rack and pinion, and a third fluid pressure actuated piston and cylinder device connected to said rack.

References Cited by the Examiner
UNITED STATES PATENTS

| | | | |
|---|---|---|---|
| 2,483,810 | 10/1949 | Cotta | 90—4 |
| 2,802,402 | 8/1957 | Perger | 90—4 |
| 2,903,933 | 9/1959 | MacKenzie | 82—23 |

WILLIAM W. DYER, JR., *Primary Examiner.*

G. A. DOST, *Assistant Examiner.*